UNITED STATES PATENT OFFICE.

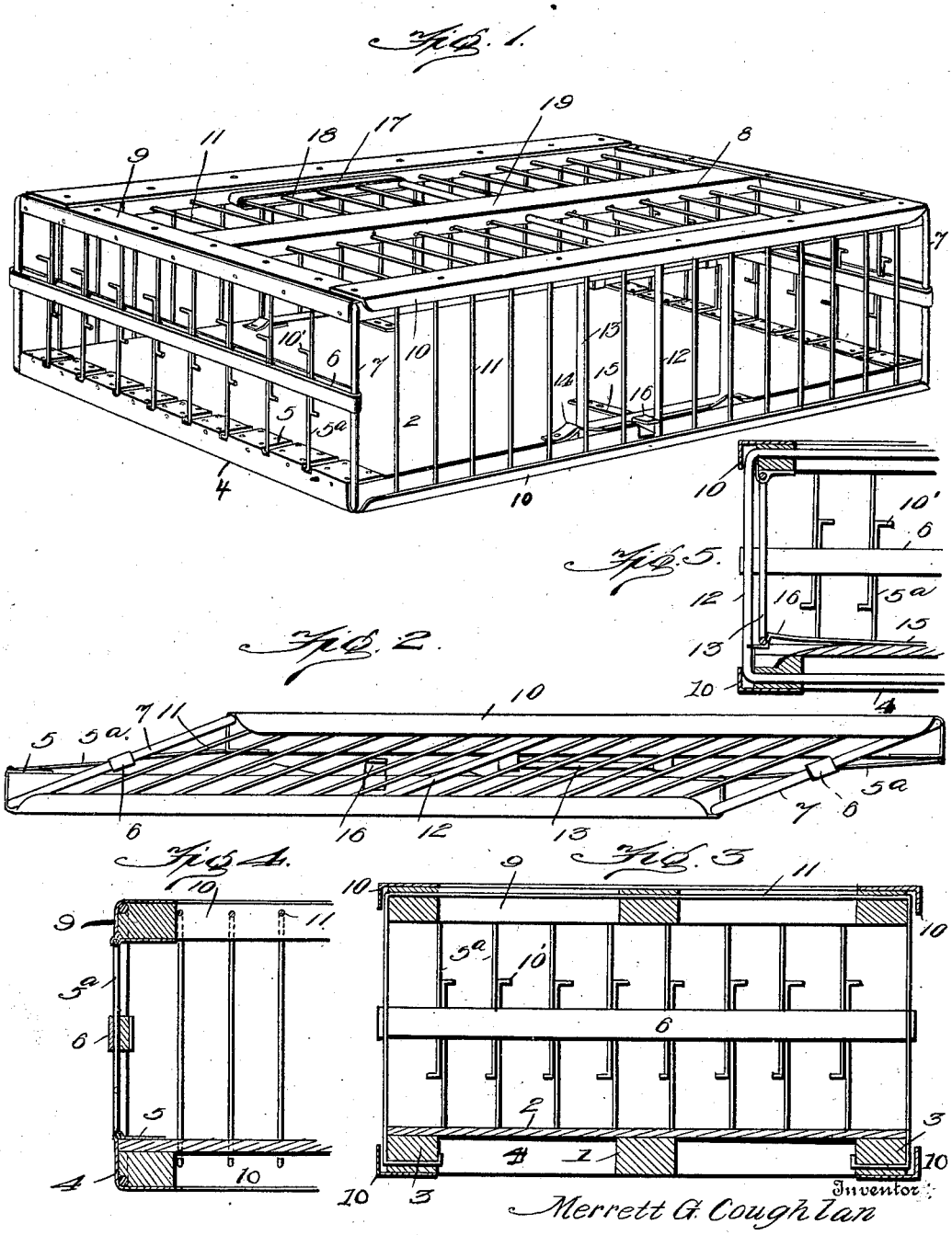

MERRETT G. COUGHLAN, OF CHICAGO, ILLINOIS.

FOLDING CRATE.

SPECIFICATION forming part of Letters Patent No. 679,730, dated August 6, 1901.

Application filed December 8, 1900. Serial No. 39,225. (No model.)

*To all whom it may concern:*

Be it known that I, MERRETT G. COUGHLAN, a citizen of the United States, residing at Chicago, in the county of Cook and State of Illinois, have invented new and useful Improvements in Folding Crates, of which the following is a specification.

This invention relates to new and useful improvements in folding crates; and its primary object is to provide a crate the top of which is adapted to swing downward in either direction.

A further object is to provide means of novel construction whereby the parts may be securely locked in open position.

With these and other objects in view the invention consists in constructing the crate of two frames—i. e., the bottom and top—and the same are connected by means of wires, the horizontal portions of which are revoluble within the top and bottom, respectively. The ends of the crate are closed by two series of wires, one series being hinged to the top, while the remaining series is hinged to the bottom, and the free ends of these wires are slidably mounted within a horizontally-extending cross-strip secured to the adjacent corner-wires of the crate. A rectangular loop is hinged to the inner surface of one of the frames of the crate and is adapted when the crate is in open position to bear upon the inner surface of the remaining frame (preferably the bottom) of the crate and prevent the same from closing until said loop is raised out of contact. Means are provided for locking this loop in contact with the bottom of the crate. Doors of peculiar construction are arranged within the crate and are formed of wires, as will be hereinafter more fully described.

The invention also consists in certain features of construction and combination of parts, which will be hereinafter fully described and claimed, and illustrated in the accompanying drawings, showing the preferred form of my invention, and in which—

Figure 1 is a perspective view of the device in open position. Fig. 2 is a side elevation thereof folded. Fig. 3 is a transverse section through the crate when in the position shown in Fig. 1. Fig. 4 is a longitudinal section through one end of the crate. Fig. 5 is a central transverse section through a portion of the crate.

In the drawings the same reference characters indicate the same parts of the invention.

1 is the frame of the bottom of the crate, having a floor 2 thereon. Secured to the side strips 3 of the frame 1 are plates 4, which extend over the tops of said strips and are provided with slots 5 in the upper faces thereof. Substantially U-shaped wires 5ª are journaled within each of the plates 4, and the arms thereof extend upward from the slots 5. Each of these arms is slidably mounted within a cross-strip 6, which is secured at opposite ends to a rectangular loop 7, journaled within one of the side strips 3 of the frame, said loop being held within said strip by the plate 4, before referred to. The opposite sides of the loops 7 are journaled within the ends of the frame 8, forming the top of the crate. Plates 9, similar in shape to the plates 4, before referred to, are secured to the ends of the frame 8, and wires similar to the wires 5ª, before referred to, are hinged within the strips and extend downward and are slidably mounted within the cross-strips 6. The ends of the arms of these wires are preferably bent laterally, as shown at 10', so as to prevent the wires from being withdrawn from said strips 6. Wires 11 extend transversely through the top frame 8 and are then bent downward along the side of the crate, the ends thereof being revoluble within the side strips of the bottom frame 1. One or more rectangular loops 12, similar to the loop 7, before referred to, are provided at points between the ends of the crate, so as to strengthen the same.

Rectangular loops 13 are hinged to the top frame 8, at the sides thereof, and are adapted when the crate is in open position to swing downward into contact with the floor 2 and prevent the crate from closing. When the crate is open and the loops 13 are in position, the lower ends thereof rest between plates 14, secured to the bottom of the crate. These plates are so shaped as to prevent any lateral movement of the loops 13.

A spring-strip 15 is secured to the bottom 2, at each side thereof, and is provided at a point adjacent to its free end with a shoulder 16. This strip is adapted to spring upward and the shoulder thereof engage its loop 13 as soon as the same is placed in proper position after the crate has been opened. Doors are provided within the top of the crate by cutting away one or more of the wires 11 and providing a strip 17, which is slidably mounted upon two or more of the remaining wires. Short wires 18 are secured to this strip and are slidably mounted within the central strip 19 of the top frame 8. It will thus be seen that when the strip 17 is slid toward the strip 19 the wires secured thereto will slip through the fixed strip. When it is desired to fold the crate, the catches 16 are depressed, and the loops 13 are then swung upward toward the top of the crate. Said top may then be swung downward in either direction, the loops 7 and 12 serving as links. As the wires 5$^a$ are hinged to the inner faces of the top and bottom, respectively, of the crate, it will be seen that when the device is collapsed the laterally-bent ends of said wires will be drawn toward each other to compensate for the increased distance between the pivots of said wires.

In opening the crate the top is swung upward from the bottom upon the loops 7 and 12 and the loops 13 are swung downward until they arrive at points between the plates 14. They are then held in this position by the spring-catches 16.

As shown in the drawings, I have provided the sides of the top and bottom of the crate with longitudinally-extending substantially L-shaped strips 10, which serve to protect the corners of the wires 11.

In the foregoing description I have shown the preferred form of my invention; but I do not wish to be understood as limiting myself thereto, as I am aware that modifications may be made therein without departing from the principle or sacrificing any of the advantages thereof, and I therefore reserve to myself the right to make such changes as fairly fall within the scope of my invention.

Having thus described the invention, what is claimed, and desired to be secured by Letters Patent, is—

1. The combination with a base; of wire loops hinged to said base, a top hinged to the loops, wires revoluble within the top and base and connecting the same at the sides, and extensible wires hinged within and connecting the ends of the top and base.

2. The combination with a base; of loops hinged thereto, a top also hinged to said loops, wires revoluble within the base and top and connecting the sides thereof, cross-strips between the ends of the top and base, substantially U-shaped wires hinged to the top and base respectively, the ends thereof being slidably mounted within the cross-strips, and means for limiting the movement of the wires within said strips.

3. The combination with a base; of loops hinged thereto, a top also hinged to said loops, wires revoluble within the top and base and connecting the sides thereof, extensible wires hinged to and connecting the ends of the top and base, a loop hinged to the top, a straight edge thereto adapted to contact with the base and prevent movement of said top, and means for locking said loop in position upon the base.

4. The combination with a base; of a top, wires revoluble within the top and base and connecting the sides thereof, a strip slidably mounted upon two of the wires of the top, wires connected thereto and slidably mounted within the top, a series of wires hinged to each end of the top and base respectively, laterally-bent ends to said wires, and a strip located between each end of the top and base, said series being slidably mounted within the strips.

5. The combination with a base and top; of slotted plates inclosing the ends thereof, loops and wires revoluble within the top and base and connecting the sides thereof, substantially U-shaped wires hinged within the end plates and extending from the slots therein, strips connecting the end loops at points between the top and base, laterally-bent portions to the end wires, said ends being slidably mounted within the cross-strips, and means for locking the top in raised position.

In testimony whereof I affix my signature in presence of two witnesses.

MERRETT G. COUGHLAN.

Witnesses:
JOSEPH H. LIVINGSTON,
CHAS. F. HAGER.